US012153462B2

(12) United States Patent
Süssmann et al.

(10) Patent No.: US 12,153,462 B2
(45) Date of Patent: Nov. 26, 2024

(54) MESOSTRUCTURAL RESET UNIT

(71) Applicant: elobau GmbH & Co. KG, Leutkirch (DE)

(72) Inventors: Manfred Süssmann, Elchingen (DE); Michael Reisch, Leutkirch (DE)

(73) Assignee: elobau GmbH & Co. KG, Leutkirch (DE)

( * ) Notice: Subject to any disclaimer, the term of this patent is extended or adjusted under 35 U.S.C. 154(b) by 0 days.

(21) Appl. No.: 18/140,265

(22) Filed: Apr. 27, 2023

(65) Prior Publication Data

US 2023/0350450 A1 Nov. 2, 2023

(30) Foreign Application Priority Data

May 2, 2022 (DE) ..................... 10 2022 110 704.3

(51) Int. Cl.

*G05G 5/05* (2006.01)
*G05G 1/04* (2006.01)
*G05G 1/06* (2006.01)

(52) U.S. Cl.

CPC ................. *G05G 5/05* (2013.01); *G05G 1/04* (2013.01); *G05G 1/06* (2013.01); *G05G 2505/00* (2013.01)

(58) Field of Classification Search

None
See application file for complete search history.

(56) References Cited

U.S. PATENT DOCUMENTS

2016/0032997 A1 2/2016 Seepersad et al.

FOREIGN PATENT DOCUMENTS

| | | | | |
|---|---|---|---|---|
| DE | 102007037709 A1 | | 2/2009 | |
| DE | 102014103988 A1 | | 9/2015 | |
| DE | 102016124493 B3 | | 12/2017 | |
| DE | 102007018891 B4 | | 7/2018 | |
| DE | 202018100242 U1 | | 1/2019 | |
| DE | 102020123843 A1 | | 3/2022 | |
| EP | 2921468 A1 | | 9/2015 | |
| FR | 2800300 A1 | | 5/2001 | |
| WO | WO-2011153973 A1 | * | 12/2011 | ........... G01N 15/088 |
| WO | WO-2016002491 A1 | * | 1/2016 | ............... A47C 7/18 |
| WO | 2016098436 A1 | | 6/2016 | |

OTHER PUBLICATIONS

Cited references from German Office Action for DE102022110704.3 (1 page).

* cited by examiner

*Primary Examiner* — Vicky A Johnson
(74) *Attorney, Agent, or Firm* — Dickinson Wright PLLC

(57) ABSTRACT

The present invention relates to a reset unit for resetting rotational and/or translational deflection movements of a setting element, which has an ordered mesostructure of elementary cells consisting of an ordered arrangement of at least one elementary cell, wherein the at least one elementary cell can be reversibly compressed and expanded through exposure to force, wherein the reset unit further has at least one signal generator and/or at least one reaction unit, wherein the reset unit further has at least one evaluation unit, which evaluates a signal emitted by the signal generator and/or electrically and/or magnetically actuates the reaction unit, wherein the signal generator and/or reaction unit are embedded in the at least one mesostructure, wherein a reset force of the reset unit can be at least partially generated by deforming the mesostructure.

13 Claims, 8 Drawing Sheets

MESOSTRUCTURAL RESET UNIT

This U.S. patent application claims priority to German patent application no. DE/10 2022 110 704.3, filed May 2, 2022, the entire contents of which is incorporated herein by reference in its entirety.

BACKGROUND

1. Technical Field

The present invention relates to a mesostructural reset unit, in particular for application in operating devices of construction machines, agricultural tractors and other commercial vehicles.

2. Related Art

Such operating devices are used among other things for controlling commercial vehicles, machines, working functions of commercial vehicles or construction machines and attachments. Within the meaning of the invention, operating devices are any devices that have control elements, for example such as travel levers, travel pedals, keys and in particular joysticks. For example, armrests that have a plurality of control elements are operating devices according to the invention. As sufficiently known for such control elements, they have reset units which move the control element from a deflected position back into its starting position through exposure to a reset force.

In prior art, these reset units are regularly elastic elements, such as springs or elastomers, but also electrical elements such as actuators, for which a force curve can also be changed after installation without replacing the installed parts, unlike the elastic elements. By contrast, the elastic elements would have to be removed from the control elements and replaced by new ones having the desired elasticity. Alternatively known as well are adaptive elastic materials, meaning whose material properties, such as elasticity, can be changed by applying a current or magnetic field. The disadvantage to all of these known reset units is that they are not adaptable, just like the elastic elements, so that a commitment must be made during production to a line of force to be determined in the future that can only be changed through a redesign, or that, just as the electrical elements, they are especially space- and material intensive, and require a plurality of different materials. Along with this, it is disadvantageous with respect to such elements that, as a rule, the maintenance of individual parts of these electrical elements is cost and time intensive. While one solution to the above in prior art involves the modular configuration of the reset units, the latter also do not resolve the problem of the resource-intensive configuration.

While the elastic materials mentioned at the outset are relatively resource-efficient as opposed to the adaptive elements, they regularly lack adaptivity. In prior art, this problem is regularly resolved by enhancing these elastic materials with an adapting module. For example, an actuator is regularly placed in front of the spring, which can preload the spring as needed, and thereby change the reset force. However, this configuration also has the disadvantage that the originally resource-efficient configuration of the elastic reset unit is likewise resource-intensive due to the adapting module, and in particular increases the costs and space requirement of the reset unit.

Therefore, the object of the invention is to indicate a reset unit that is especially resource-efficient and adaptively expandible.

In order to achieve this object, the invention provides among other things for the use of a mesostructure. Mesostructures in prior art are per se generally known as structures having a porosity. This porosity can be a stochastic porosity, for example as in sponges or foams, but also an ordered porosity, for example a honeycomb structure. An ordered porosity leads to a structure consisting of individual elementary cells, the behavior of which during compression or decompression is defined based upon the properties of the elementary cells. Likewise conceivable is an ordered mesostructure with different, combined elementary cells, for example which vary in their shape or material properties. As a result, the behavior of the structure is likewise determined by the arrangement and alignment of these different types of elementary cells.

The design of the mesostructure is configured so that the material yields in a defined manner, thereby enabling one or several defined degrees of freedom. To this end, the mesostructure is designed in such a way that parts of the volume structure or the material orientation at least partially do not follow the direction of force. This leads to movement, or to a yielding of the structure. As a consequence, the force flow can be guided in an optimized manner by configuring the mesostructure out of a combination of several elementary cells. Depending on the material, such mesostructures are also especially easy to manufacture, for example using an additive method like 3D printing.

The mentioned object is achieved by a reset unit for resetting rotational and/or translational deflection movements of a setting element, which has an ordered mesostructure of elementary cells consisting of an ordered arrangement of at least one elementary cell, wherein the at least one elementary cell can be reversibly compressed and expanded through exposure to force, wherein the reset unit further has at least one signal generator and/or at least one reaction unit, wherein the reset unit further has at least one evaluation unit, which evaluates a signal emitted by the signal generator and/or electrically and/or magnetically actuates the reaction unit, wherein the signal generator and/or reaction unit are embedded in the at least one mesostructure, wherein a reset force of the reset unit can be at least partially generated by deforming the mesostructure.

According to the invention, the reset unit can be used in a setting element, which in the sense of the invention in particular can be a control lever or another control element, although the reset unit is also suitable for use with other contact surfaces, which for example are to have a force-feedback function. According to the invention, the reset unit has an ordered, but not stochastic mesostructure. This mesostructure is formed out of at least one elementary cell, which, provided there at least two elementary cells, are configured, arranged, and connected depending on the intended force effect. Each elementary cell is initially characterized by the fact that their shape connects two points in space via an indirect path. One elementary cell always has a curvature or edge. In an alternative of the invention, it is here especially advantageous that each elementary cell have at least one pore, which is a recess, which is enclosed in at least one plane, meaning that any starting point on the framework of the elementary cell can be found again as an end point by completely running the frame. For example, a ring or some other framework with a hole is such an elementary cell with a pore. Therefore, even a framework shaped like an eight with two holes is such an elementary cell. In addition, the material forming the mesostructure is a flexible material. Based upon this configuration and the material composition of the elementary cells or the mesostructures, the latter can be reversibly compressed and expanded during an application of force. The application of force that leads to the compression or expansion of the elementary cells can here be point or area, a translational or rotational force. The direction of force is not necessarily limited to the aforementioned plane of the pores or elementary cell. Due to the application of force on the reset unit, a force acts on the mesostructure, and hence on at least one elementary cell, which is deformed as described. As a result, all elementary cells connected with this deformed elementary cell are also deformed. In addition, this deforms the mesostructure as a whole. Due to the reversibility of the compression and expansion of the elementary cells and their linear-elastic material behavior, they generate the reset force that resets the mesostructure in its resting position. The specific arrangement of the elementary cells and configuration of their degrees of freedom generate a defined spatial spring effect of the reset unit. In addition, the advantage to such mesostructures is that they are especially easy to manufacture, for example using an additive method like 3D printing.

A signal generator is understood as an element integrated or arranged in the mesostructure, which emits a signal that is perceptible outside of the reset unit by the evaluation unit, and thereby ensures that the positions or parameters of the structure can be determined with respect to expansion, material parameters or similar parameters. If the shape of the mesostructure is influenced by compression or expansion, the signal of the at least one signal generator is thus also changed. As a result, the change in shape of the mesostructure can also be determined via the signal of the signal generator. By contrast, the reaction unit is to be understood as an element that reacts to an external action, for example to a magnetic or an electric field, with a corresponding change in at least one property, such as the position, orientation, or stiffness. The reaction unit is here arranged in or on the mesostructure or at least one elementary cell in such a way that the change in the property of the reaction unit leads to an altered force line of the reset unit. In this way, the reaction unit, just as the signal generator, can be a component of the mesostructure or elementary cell, or only be arranged thereon. Since the elementary cells allow movement, their shape is changed by a response of the reaction units. This makes it possible to realize an intentional change in state of individual elementary cells, in particular with respect to their stiffness or shape, and hence of the entire mesostructure. By actuating the reaction units in a targeted manner, the force line of the reset unit can thus be adjusted to the specific requirements as needed and specific to the situation. In the sense of the invention, the evaluation unit is an element that receives the change in the aforementioned parameters of the signal generator. An evaluation in terms of a utilization or interpretation of the received signals is here not mandatory. A detection of a change is thus also sufficient in itself. Alternatively or additionally, the evaluation unit is an element that actuates the reaction unit, and thereby triggers the desired reactions of the latter as required.

These types of mesostructures, which have signal generators and/or reaction units embedded in their structure, are suitable for absolute or relative measurements. An absolute measurement here takes place by determining the change in position of the signal generators based on a deformation of the mesostructure. By contrast, a relative measurement takes place by determining the deformation of the signal generators via the change in physical properties resulting therefrom, for example its electrical resistance. The precondition for the above involves the use of deformable signal generators, meaning in particular those which are integrated into the structure of the elementary cells or mesostructures, and form a reversibly compressible and expandible part of the elementary cell or mesostructure. Therefore, the force line of the reset unit can be changed either by locking one or several elementary cells or changing the stiffness. As a consequence, it can be continuously adjusted between two limit values. For this purpose, both the preload and the stiffness of the elementary cell can be adjusted.

If the reset unit especially preferably has at least two in particular identical mesostructures, which are connected in parallel in terms of force application, it is irrelevant with respect to the correct function of the invention if individual mesostructures were to drop out, for example due to fatigue and breakage of the material, since the remaining functional mesostructures can continue generating the reset force. In the sense of the invention, the parallel connection of mesostructures is here to be understood as an arrangement of the latter one next to the other, so that the arrangement of mesostructures is perpendicular to the direction of force application. If the mesostructures are identical, they are the same with respect to their structure, shape, material, and arrangement. The advantage of mechanical redundancy is strengthened as the number of applied, parallel connected mesostructures increases. As a whole, the reset unit is in this way subjected to less of a load, if the load from a mesostructure that dropped out is distributed among as many remaining functional mesostructures as possible. This advantageous load distribution can otherwise also arise within a mesostructure if it has an especially high number of elementary cells connected in series and/or in parallel, for example in the form of a grid, in which an elementary cell could drop out, while the load originally handled by this elementary cell is distributed among the remaining, undamaged elementary cells. Also conceivable is a parallel connection of nonidentical mesostructures. This makes it possible to achieve a specific reset force distribution via the reset unit, for example in the form of overprint points, which are generated by arranging rigid mesostructures between otherwise less rigid mesostructures.

Likewise, it is especially advantageous if at least one mesostructure has at least two different elementary cells, which differ with respect to their structure, shape, material and/or arrangement. The mesostructure can here also have portions of a stochastic mesostructure enhanced by elementary cells according to an ordered mesostructure. By selecting the structure and shape of the elementary cells, the force line of the reset unit can be influenced, for example depending on the compression or tensile force. Different materials according to the invention in particular include those materials that can be produced via an additive manufacturing process, for example via 3D printing, so as to make production especially easy. Likewise advantageous are electrically conductive or magnetic materials, which can serve as signal generators and/or reaction units. In this way, individual elementary cells can be preloaded when applying a magnetic or electric field, and the force line of the reset unit can thereby be influenced. However, basically any reversibly flexible materials fit the invention. In particular, the arrangement of elementary cells can differ with respect to their orientation relative to each other. Different force reactions in different spatial directions can be generated by combining such different elementary cells. These different force reactions can be linear and nonlinear forces, which can be combined into force lines suitable for the application. In addition, this makes it possible to achieve an elevated stability against the various forces in different spatial directions. The high number of combinable materials, structures, shapes, and applications yields a high number of possible embodiments of the reset unit according to the invention, and hence a high variability of application.

A further development of the invention provides that an elastic element, in particular a spring or an elastomer, or an adaptive element, in particular an actuator or an MRF element, be placed upstream and/or downstream from at least one elementary cell in terms of force application. In the sense of the invention, the upstream or downstream placement is to be understood as a series connection, in which the elementary cell and the elastic or adaptive element are arranged parallel to each other relative to the direction of force application. The elastic element is here understood to be a purely passive element, which upon deformation generates its own predefined reset force, which overlays the reset force of the upstream or downstream elementary cell. The adaptive element is understood to be active elements, which can be operated by a user. In this way, a user can actuate the adaptive element to set the reset force thereby generated or the preload of the upstream or downstream elementary cell as needed. An MRF element is here an element having a magnetorheological fluid, whose viscosity can be influenced by a magnetic field. These elements make it possible to generate a preload at specific locations within a mesostructure. This enables additional options for setting a force line suitable for the application. In particular adaptive elements make it possible to switch on a preload or a final damping, if needed. As a consequence, the force line of the reset unit can also be adjusted to a needs-based linear or nonlinear force line. Otherwise, such a series connection of elastic and/or adaptive elements with at least one mesostructure is also proposed according to the invention, so that the preload also acts on an entire mesostructure. The latter can be combined with the series connection of the elementary cells and elastic and/or adaptive elements arranged in the aforementioned mesostructure, so as to be able to define an especially detailed force line distribution over the entire reset unit.

An embodiment of the invention provides that the evaluation unit be connected with the mesostructure not mechanically, but effectively. In particular, the advantage achieved as a result is that the evaluation unit can also be arranged outside of the mesostructure, or even outside of the reset unit. In particular, an effective connection according to the invention is a connection via an electric field or a magnetic field, but also via a light signal, which is incident on the mesostructure and its light-conducting signal generators, and is refracted by the latter, and subsequently received by the evaluation unit. This makes it possible to advantageously refrain from having to use potentially high-maintenance components for manufacturing a mechanical connection. In addition, this prevents any failures of these components, and ensures a more precise and constant signal transmission between the evaluation unit and signal generator and/or reaction unit.

A further development of the invention provides that the shape and/or elasticity of the reaction unit can be influenced by a current applied thereto or a magnetic field. The application of a current to the reaction unit is understood in particular as a current induced by a magnetic field or an external electric field acting on the reaction unit, wherein the reaction unit is actuated in both cases by the evaluation unit in a nonmechanical, wireless manner. Accordingly, the material and other configuration of the reaction unit are selected in such a way according to the invention that the reaction unit reacts accordingly to electric or magnetic influences. In particular, these are electrically and/or magnetically conductive materials. Environmental influences such as a natural or for other reasons external magnetic field can here be offset through the specific actuation of the evaluation unit.

An embodiment of the invention provides that it have latching elements, which latch in the at least one signal generator and/or the at least one reaction unit at a prescribed position. While these can be mechanical latching elements, they are especially preferably magnetic latching elements, which interact with a magnetic field generated by signal generators or reaction units arranged in the mesostructure, and based thereupon latch in during an approach between the latching element and corresponding signal generator or reaction unit to a predefined distance. This predefined distance can here be determined and influenced via the magnetic field strength. Therefore, if the latching elements have an adaptive design, the predefined distance can be adjusted via the suitable selection of an applied current strength. For this purpose, the latching elements in particular are not arranged inside of the mesostructure or so that they can move together with it. Rather, it is advantageous if the latching elements for a system in which the mesostructure is movable be immovable in design. For example, this can be satisfied by arranging it on a housing which accommodates the reset unit. Furthermore, the advantage to this is that latching elements adaptively configured via simple switching circuits that can be immovably designed can be supplied with current, and thereby actuated. Accordingly, the latching between the latching element and signal generator and/or reaction unit can be disengaged either by correspondingly actuating the latching elements, provided they are likewise adaptive in design, or the reaction unit, or by compressing or expanding the mesostructure in such a way that the distance between the latching elements and signal generator or reaction unit exceeds the mentioned predefined distance.

A further development of the invention provides that the at least one signal generator and/or the at least one reaction unit be selected from the following group: Metal wire, metal particles, coil, electromagnet, carbon fiber, CFK fiber, conductive plastic, magnet. Depending on the group element, for example in the case of electromagnets, its function as a signal generator or reaction unit can be activated by applying a current or changed depending on current strength. As a result, the force line of the reset unit can also be precisely adjusted as needed at any time, even without it being mechanically converted. These types of materials are also especially well suited as pure signal generators, since they can be switched on or off depending on environmental conditions or need, and the reset unit can once again be more variably used. By contrast, however, simple magnets can also be used according to the invention as the signal generator or reaction unit, which owing to their constructive simplicity are especially well suited for simple applications, which do not require an especially precise or specific change in the force line of the reset unit. Likewise suitable for use as signal generators and in particular as reaction units are materials whose stiffness is changed by applying a current. The invention further includes those light guides as signal generators in which signals are generated by refraction, i.e., a light coming from outside of the mesostructure is varyingly refracted or covered depending on the deformation of the mesostructure, and this influenced light is perceptible from outside of the mesostructure. Likewise in keeping with the invention is the use of signal generators that form a part of the mesostructure or individual elementary cells, i.e., are molded or integrated therein. Also known and inventive as suitable materials or components with several states are shape memory alloys, such as piezo metals.

An embodiment of the invention provides that the at least one evaluation unit be selected from the following group: Coil, electromagnet, Hall sensor, printed circuit board, strain gauge. Depending on the type of evaluation unit selected, in particular magnetic signals of signal generators can be evaluated in the form of an electric current, for example which is induced in a coil due to the magnetic field of the signal generator. In an alternative case, for example for an electromagnet, the evaluation unit can be actuated in such a way that it generates an electric or in particular magnetic field on its own, and reaction units in the mesostructure react to this with their own magnetic field through repulsion or attraction. In the case of a coil as the evaluation unit, it even becomes possible to both evaluate a signal in the form of a magnetic field via the current induced in the coil, and actuate a reaction unit by way of the coil via an applied current and a magnetic field generated therefrom. Accordingly, such combined evaluation units are also in keeping with the invention.

An embodiment of the invention provides that the reset unit have different mesostructures, which are interchangeable in use. This interchangeability is advantageous in particular for such mesostructures that differ with respect to their structure, shape, material and/or arrangement. Changing out the mesostructures makes it possible to switch between different, predefined force lines, which as already described above arise from the respective constitution of the selected mesostructure. This enables a needs-based activation of a specific mesostructure, whose force line corresponds to the current application. In particular in applications where different environmental factors or usage types arise, an individual reset unit can be optimally adjusted for the most varied of requirements. For example, the reset unit can be used in an operating device of an agricultural machine like a tractor, to which the most varied of working machines with different functions are coupled. These are usually controlled via a constant central controller in the tractor. However, the reset unit according to the invention can be used to always adjust the control device to the connected working device, at least in terms of the reset force lines. A further development of the invention provides that the different mesostructures be interchangeable with each other in the reset unit by means of a changing magazine, in particular a drum changing magazine. This yields the advantages to the different interchangeable mesostructures described above. In the sense of the invention, a changing magazine is a device in which several different mesostructures are accommodated separately from each other and retrievable. For example, this can be a linearly displaceably mounted magazine, whose displacement makes it possible to retrieve different mesostructure segments. However, an especially advantageous drum changing magazine is one that constitutes an especially simple embodiment of a changing magazine, in which the mesostructure to be used is turned into an active position, while the remaining mesostructures are not effectively connected with an element to be reset, for example an operating device. In addition, a drum changing magazine can be designed in an especially space-saving manner. The application of such a changing magazine enables a modular configuration of the reset unit, in which individual mesostructures can be exchanged, for example during maintenance or given modified requirements on the reset unit. Accordingly, it is especially advantageous that the different mesostructures be insertable into the changing magazine in a detachably connectable manner.

Further proposed according to the invention is an operating device having a reset unit as described above. In particular those operating devices which usually have a reset unit can be variably used as needed through the application of the reset unit according to the invention described above. This is especially advantageous in particular with respect to joysticks and other control levers, but also with respect to control keys and touchpads. Operating devices whose operating motion involves a rotational movement can also have the reset unit according to the invention. It is here especially advantageous that the operating device be effectively connected with the reset unit in such a way that the movement of the operating device produces a compression or expansion of the reset unit, so that the latter triggers a reset force on the operating device. In addition, a rotational force acting on the mesostructures provided in the reset unit can also be offset by the mesostructures given the corresponding properties.

A configuration of the operating device according to the invention provides that it have a control lever, wherein the reset unit is mounted in the control lever, in particular in a handle or in a part of the control lever that scans a cam. The configuration of the reset unit and the shape of the cam can here form a needs-based force line, by way of which the control lever sends out feedback to a user that varies depending on position or deflection. This force line can here be modified not just by the cam selected. Rather, the design flexibility is especially great based upon the possible high complexity of the mesostructure. In addition, the reset unit is especially low maintenance due to the redundancy of the elementary cells. If the reset unit is arranged in the handle of the control lever, it not only provides for an easy presence detection based upon signal generators. Rather, this makes it possible to acquire and correspondingly anticipate information about the desired operating device.

A further development of the operating device according to the invention provides that it have a cam into which a control lever is guided, wherein the reset unit resets the cam. With regard to the embodiment of the invention described above, in which the reset unit is mounted in the control lever, the force line of the reset force can also be adjusted in this embodiment by the shape of the cam or the configuration of the reset unit. Depending on the shape of the cam, the cam is here forced away from the element of the control lever that scans the cam at a specific deflection of the control lever, and the reset unit is tensioned accordingly. The reset force generated by the reset unit forces the cam, and hence also the control lever guided in the cam, into its starting position. One especially simple arrangement of the reset force involves an arrangement on the cam on the side of the cam lying opposite the control lever. In addition, it is especially advantageous that the cam have a flexible design, i.e., that it can be forced away by the control lever and reset by the reset unit not just in its entirety. In this way, the great design flexibility of the reset unit makes it possible to provide individual sections of the cam with varying stiffnesses of the reset unit. This effect can be reinforced again with volume bodies on the cam, in particular those having a stiffness that differs from the remainder of the cam. In this way, selecting the suitable cam shape and the configuration of the reset force makes it possible to generate a needs-based force line, and thereby create an overpressure point. In this way, evaluation units and signal generators and/or reaction units can be used in the reset unit to form adaptive cams. In addition to the aforementioned variability of the reset unit, the force line can once again be adjusted by correspondingly actuating the reaction units.

The invention likewise advantageously proposes that the cam consist of multiple parts, wherein at least one of these cam parts is reset by a reset unit. In such an embodiment, the control lever itself need not be reset by a reset unit. Rather, at least one of the cam parts is reset by the reset unit here as well. This can be realized in the form of a cam system, in which the at least one cam part comprises a cam for the control lever guided in the latter, wherein the cam subjects the control lever to a reset force altered depending on its position. The invention likewise provides that individual sections of a cam, which are only contacted by the control lever guided therein during specific deflections thereof, be provided with reset units or reset units differing from the remaining cam parts, so that a needs-based reset behavior of the reset unit can be achieved depending on the control lever deflection. This makes it possible to again generate more specific force lines of the reset unit and an especially individual cam system, for example with overprint points.

An embodiment of the operating device according to the invention provides that it have a contact surface contacted by a user, which is reset by the reset unit. By applying the reset unit according to the invention in such contact surfaces, the haptics of the contact surface can advantageously be adaptively defined depending on the properties of the reset unit and the mesostructures used therein, but also depending on actuations of possible reaction units. These adjustable haptics make it possible to variably adjust the contact surface to a user who is contacting it. In addition, a segmentation of the reset unit allows the haptics to be locally limited and especially precisely adjusted to the user, or to deliver feedback information about the contact surface to the latter. In particular, this reset unit makes it possible to intelligently detect the presence of a user on the contact surface, as well as to identify an operator request depending on the type of contact. If the contact surface is a support surface, for example an arm support surface of an armrest, the latter can be equipped with the reset unit over its entire surface. In this case, the support surface yields ergonomically according to the contact of the user, depending on the stress and stress position. Here as well, the stiffness can be defined by the structure, shape, material, and arrangement of the mesostructures and elementary cells of the reset unit. A spatially variable stiffness can also be defined by the reset unit according to the invention. By contrast, a variable stiffness could only be achieved with a high design effort when using conventional upholstery. In the case of a contact surface in the form of a control surface, for example a touchpad, the haptics of the contact surface can likewise be defined through the needs-based and suitable selection of the structure, shape, material, and arrangement of the mesostructures and elementary cells of the reset unit. In the case of a touchpad, the reset unit is especially advantageously designed as a flat mesostructure with integrated signal generators and/or reaction units. As a consequence, a finger pressure can be identified by the deformation of the mesostructure. Since the mesostructures are not comprised of solid material, the symbolism from a screen can be shown to a user through the reset unit by light shining through or via printed light guides. The repeatedly described haptic feedback also results in an improved operating feel by comparison to displays with touch function common in prior art. Likewise, correspondingly actuating the reset unit makes it possible to adaptively adjust the operating force or the shape of the control surface. A handle of the control lever, i.e., the part [word missing] to a user and contacted by the latter during use, is likewise proposed as the contact surface according to the invention, in which using the reset unit offers the same advantages already mentioned. This provides the user with both a specific haptic and a visual feedback resulting from the change in shape of the contact surface. Based upon the configuration of elementary cells and the mesostructure formed from the latter, the structure also makes it possible to detect the light of a display shown behind it. The light behind the structure can shine through it, or also be routed through light guides integrated into the structure of the reset unit, and thereby shown to a user in front of the reset unit.

BRIEF DESCRIPTION OF THE DRAWINGS

In a preferred embodiment, the invention will be exemplarily described with reference to a drawing, wherein several advantageous details may be gleaned from the figures of the drawing.

Functionally identical parts are here provided with the same reference numbers.

Specifically shown on the figures of the drawing are:

Figure 1:
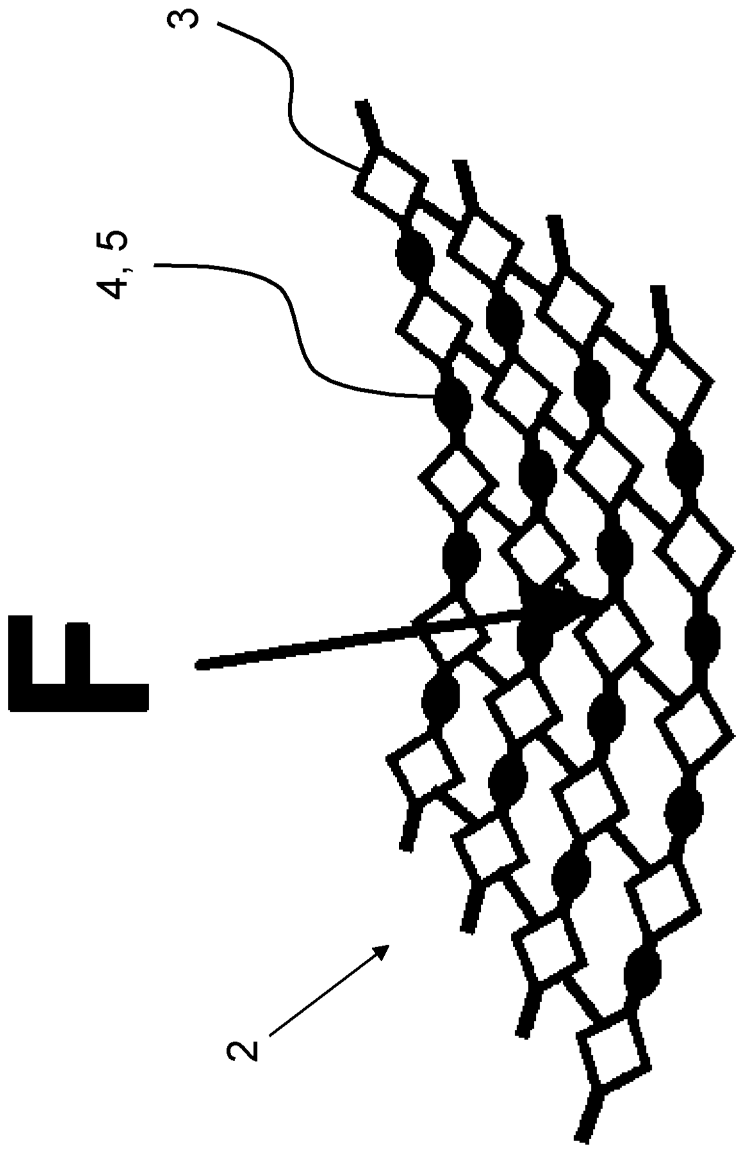
Figure 2:
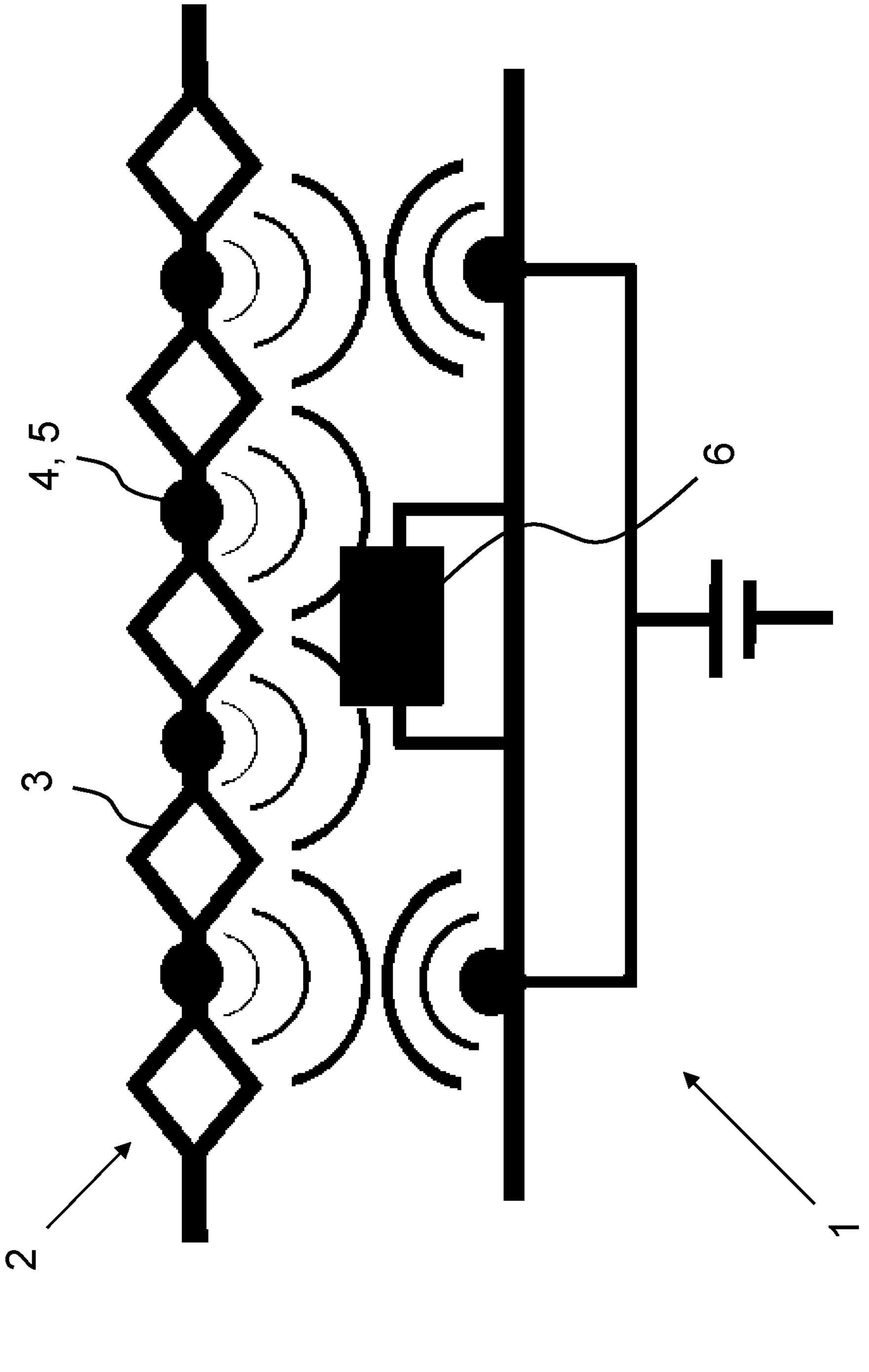
Figure 3:
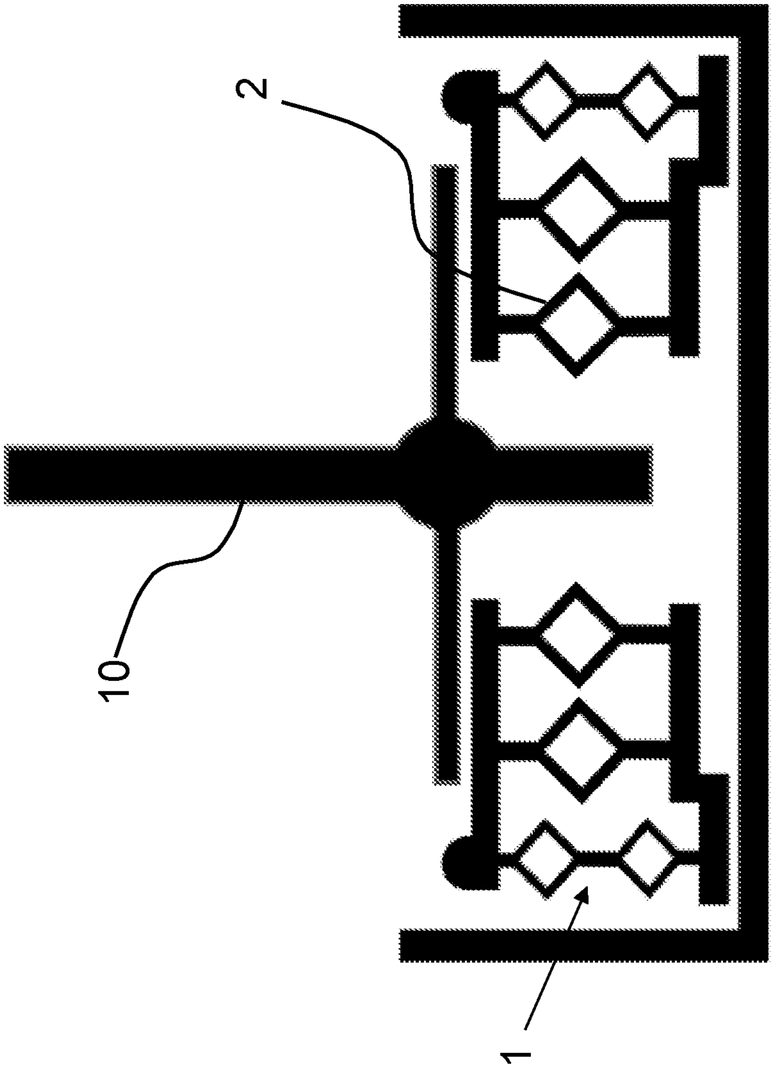
Figure 4B:
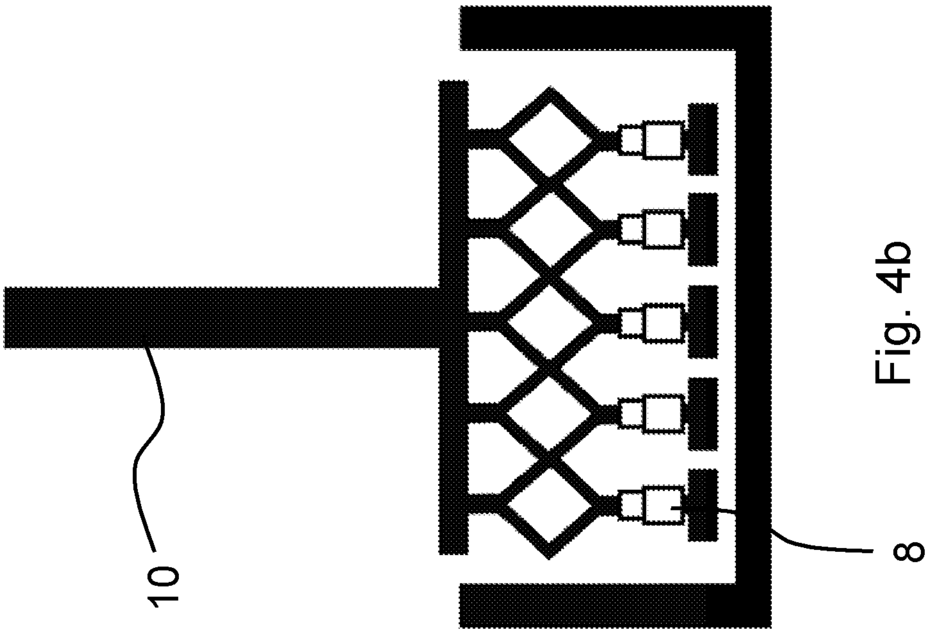
Figure 4A:
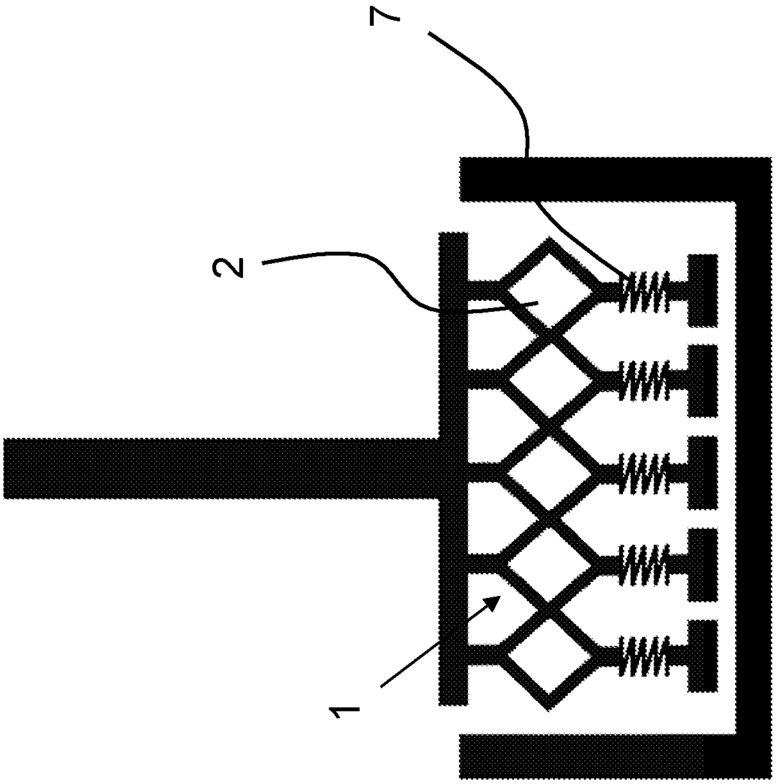
Figure 5:
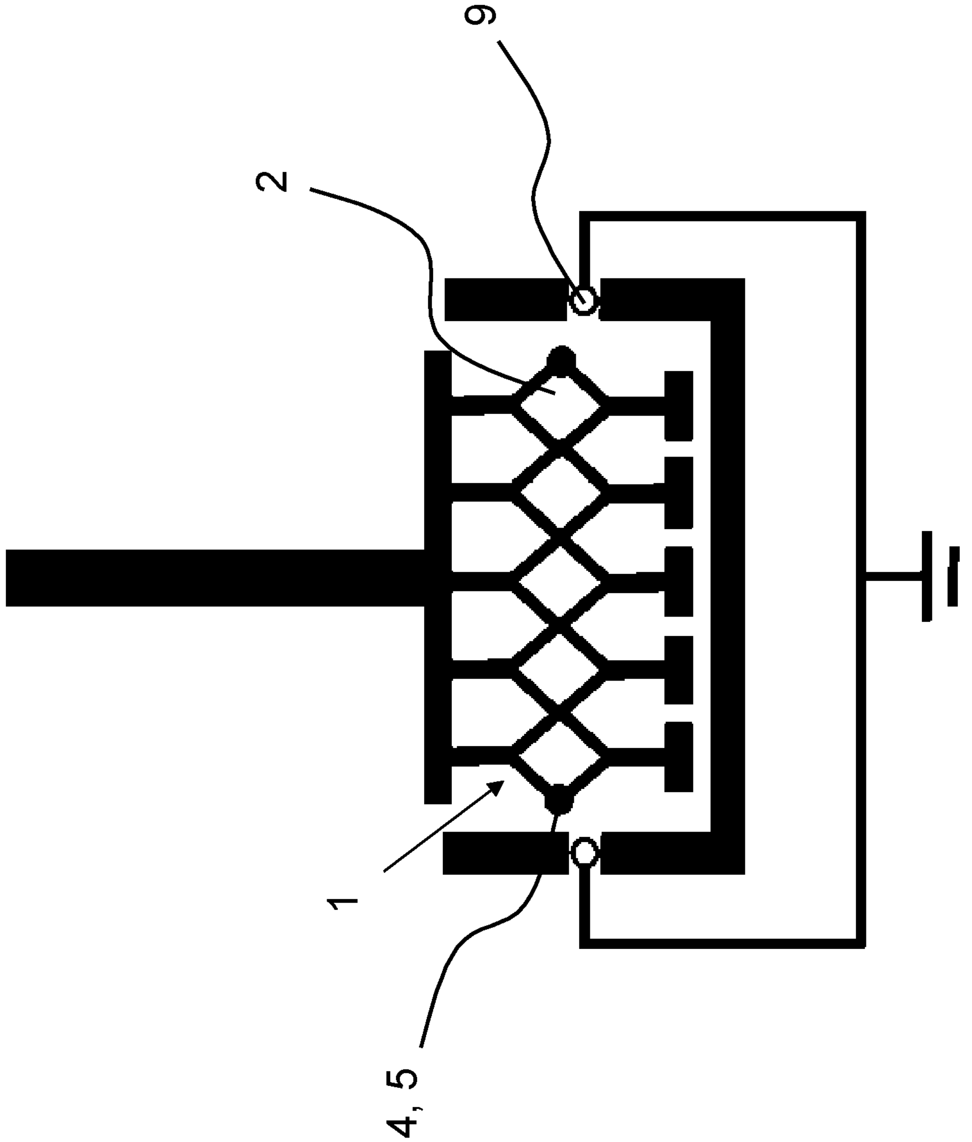
Figure 6A:
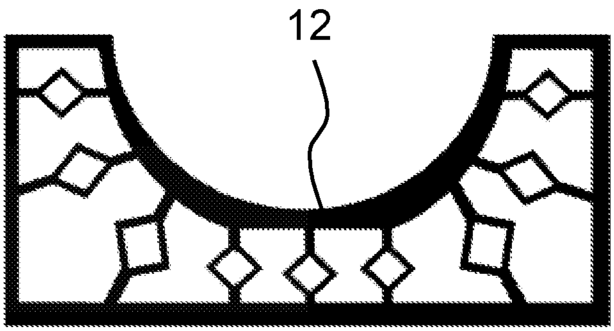
Figure 6B:
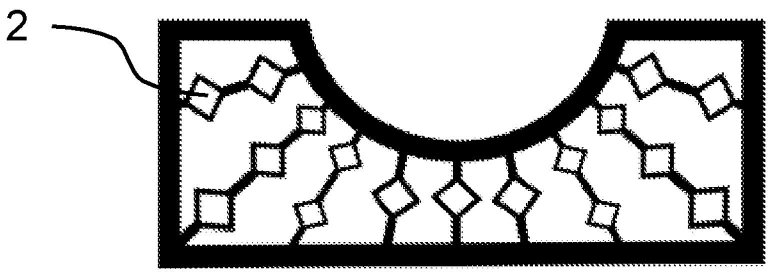
Figure 6C:
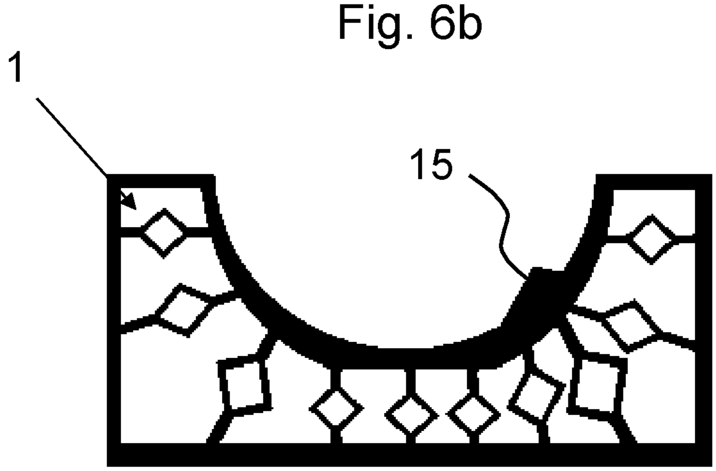
Figure 7:
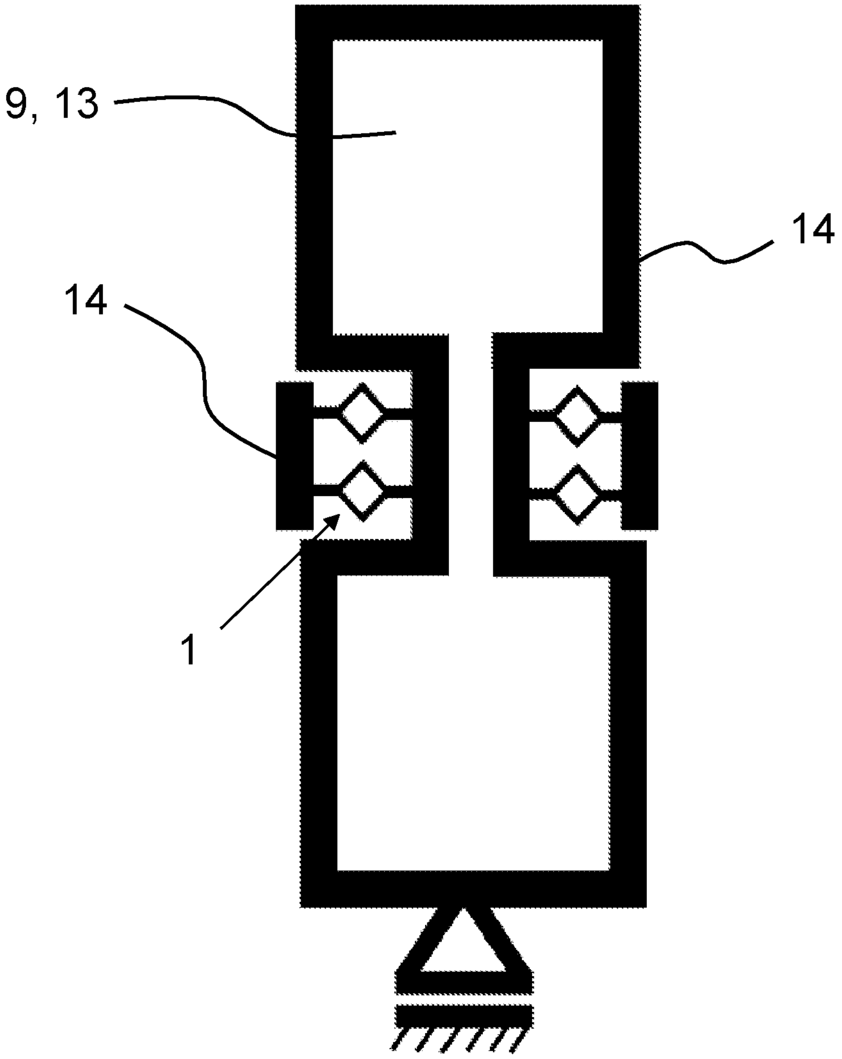
Figures 8A, 8B:
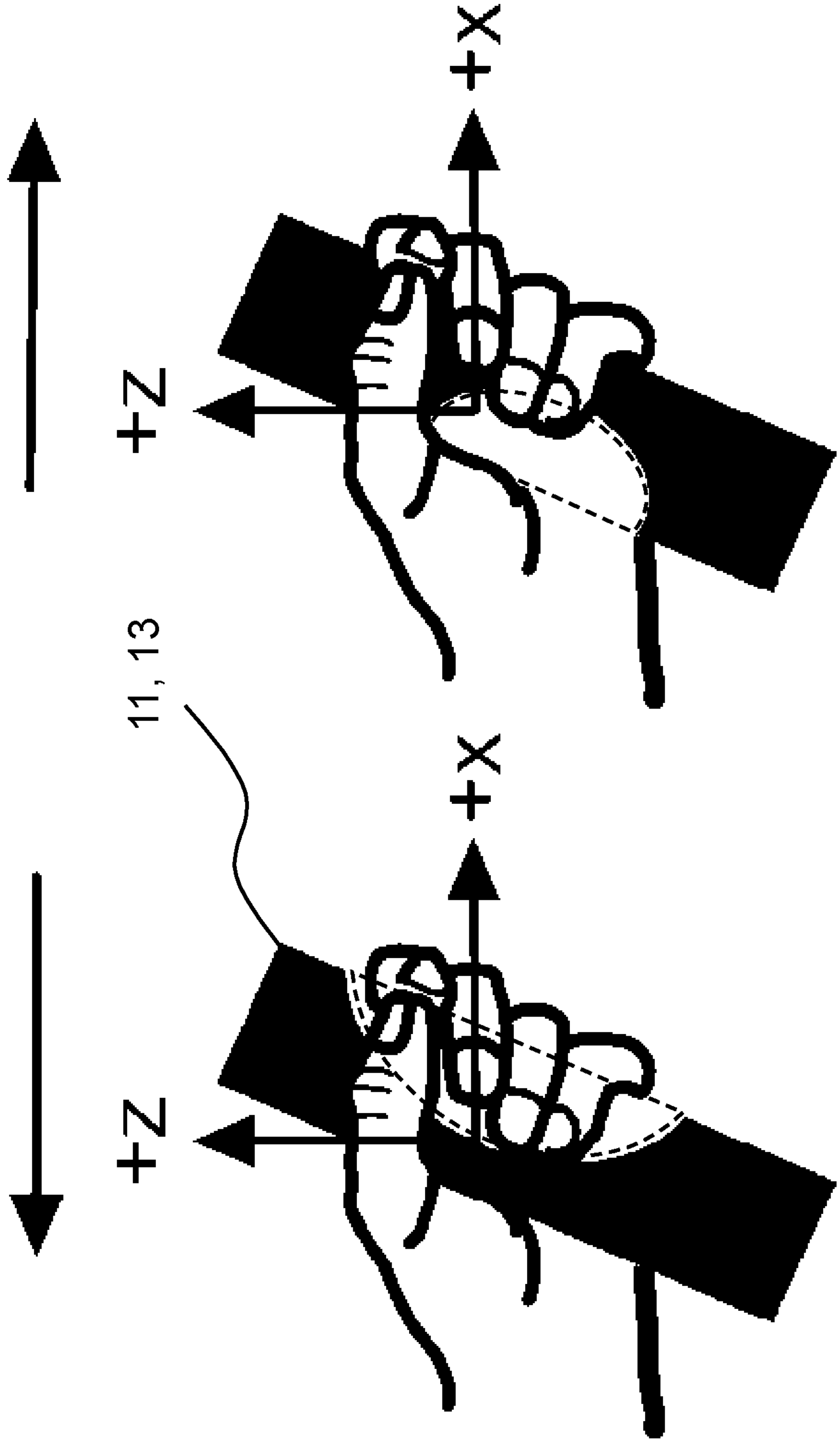

FIG. 1: an exemplary mesostructure in the sense of the invention,

FIG. 2: a first alternative of a reset unit according to the invention,

FIG. 3: a first alternative of a reset unit according to the invention during application with an operating device in an idle state, FIG. 4*a*: a second alternative of a reset unit according to the invention during application with an operating device in an idle state, FIG. 4*b*: a third alternative of a reset unit according to the invention during application with an operating device in an idle state, FIG. 5: a reset unit according to the invention with latching elements, FIG. 6*a*: a first alternative of a reset unit according to the invention during application with a flexible cam, FIG. 6*b*: a second alternative of a reset unit according to the invention during application with a flexible cam, FIG. 6*c*: a third alternative of a reset unit according to the invention during application with a flexible cam, FIG. 7: a reset unit according to the invention during application in the handle of a control lever, FIG. 8*a*: the effect of a reset unit according to the invention during application in the handle of a control lever with the control lever moving in a negative x-direction, FIG. 8*b*: the effect of a reset unit according to the invention during application in the handle of a control lever with the control lever moving in a positive x-direction.

DETAILED DESCRIPTION OF EXAMPLE EMBODIMENTS

FIG. 1 shows an exemplary mesostructure 2 in the sense of the invention. The mesostructure 2 here has a plurality of elementary cells 3 connected with each other, which here are depicted only schematically as rhombic cells, but alternatively can assume the previously mentioned different designs, as needed. Just as the mesostructure 2 as a whole, the elementary cells 3 are here flexible in design, so that the mesostructure 2 as a whole is deformed depending on the application of force. The application of force in the middle of the mesostructure 2 depicted here correspondingly presses the latter downward at this location, so that the mesostructure 2 is expanded toward this location. In addition, signal generators 4 and/or reaction units 5 are arranged in the mesostructure 2 between the elementary cells 3, and fixedly connected with the mesostructure 2, so that a deformation of the mesostructure 2 leads to a change in position of the signal generators 4 and reaction units 5 in space. If the case here involves signal generators 4, the change in position of the signal generators 4 makes it possible to determine the extent to which the mesostructure 2 was deformed. For this purpose, the signal of the signal generators 4 that was altered by the change in position is read out and correspondingly interpreted by an external unit not shown here. Alternatively thereto, during the use of reaction units 5, the stiffness of the mesostructure 2 or its preload can be influenced by the targeted actuation of the reaction units 5 due to the fixed connection between the latter and the mesostructure 2. In this case as well, actuation takes place via an external unit not depicted here, in particular via the generation of a magnetic field. An application of signal generators 4 and reaction units 5 within a shared mesostructure 2 is also provided here. This makes it possible to realize the advantages of both the signal generators 4 and the reaction units 5 in the mesostructure 2.

FIG. 2 shows a first alternative of a reset unit 1 according to the invention. The reset unit 1 depicted here is identical to the one shown on FIG. 1, wherein it is here shown only in a side or cross sectional view. Accordingly, the reset unit 1 has a mesostructure 2, which in turn has a plurality of elementary cells 3. Here as well, signal generators 4 and/or reaction units 5 are arranged between the elementary cells 3, and fixedly connected with the mesostructure 2, so that a deformation of the latter also leads to a change in position of the signal generators 4 and reaction units 5. The evaluation unit 6 is arranged outside of the mesostructure 2, but effectively connected with it, and in this case is a combined evaluation unit 6. Therefore, the latter on the one hand has a Hall sensor, which is used to determine a magnetic field generated by the signal generators 4. Accordingly, the Hall sensor can be used to determine a change in this magnetic field, in particular a type of change that stems from a change in position of the signal generators 4. This makes it possible to also determine the kind and extent of the deformation of the mesostructure 2, and thereby also the application of force on the latter. The evaluation unit 6 likewise has electromagnets, which are supplied with current via a simple current circuit, and generate a magnetic field that interacts with the magnetic fields of the reaction units 5. Depending on the polarity of the magnetic fields, the mesostructure 2 can in this way be preloaded by a deformation given the targeted actuation of the reaction units 5. However, if the reaction units 5 form structural elements of the mesostructure 2, and their elastic properties can be influenced by magnetic fields or electric fields, the stiffness of the mesostructure 2 as a whole can be adjusted by their targeted actuation.

FIG. 3 shows a first alternative of a reset unit 1 according to the invention during application with an operating device 10, also referred to as a setting element, in an idle state. The reset unit 1 is shown during application with an operating device 10, wherein the operating device 10 has an arm or a plane perpendicular to the longitudinal axis of the operating device 10, which when the operating device 10 is deflected comes into contact with the reset unit 1, and compresses it. The reset force generated in the reset unit 1 resets the operating device 10 into its idle position. The reset unit 1 has several mesostructures 2 connected in parallel to each other, which here are depicted as schematic squares. This schematic illustration comprises any forms of mesostructures 2 which according to the invention each have at least one elementary cell. The parallel connection of the mesostructures 2 is to be understood as an arrangement of the latter one next to the other, so that the arrangement of the mesostructures 2 is arranged perpendicular to the direction of force application. This redundancy of the parallel connected mesostructures 2 can compensate for the failure of individual mesostructures 2 by redistributing the forces to the remaining mesostructures 2. As a result, the function of the reset unit 1 remains completely intact even given the failure of individual mesostructures 2. By serially connecting mesostructures 2 at selected locations, i.e., by arranging the mesostructures 2 in a direction of force application relative to each other, force lines that differ from the remaining mesostructures 2 can be generated at these locations, for example so as to form overprint points. By suitably selecting serial and parallel connections for the mesostructures in specific positions, a specific, needs-based force line of the reset unit 1 can be achieved in this way.

FIG. 4*a* shows a second alternative of a reset unit 1 according to the invention during application with an operating device 10 in an idle state. In this embodiment, the operating device 10 transmits both swiveling movements as well as tensile and compressive movements to the reset unit 1, as a result of which the reset unit and the flexible elements contained therein are compressed and expanded accordingly. In this embodiment, the reset unit 1 has a plurality of mesostructures 2 connected in parallel to each other, which offer the advantages already mentioned. In the embodiment shown, the mesostructures 2 and elastic elements 7 are here connected to each other in series in the form of springs, i.e., arranged parallel to each other relative to the direction of force application. In the sense of the invention, the spring is a simple variant of an elastic element 7, which is a passive element that upon deformation generates a predefined reset force which overlays the reset force of the upstream or downstream mesostructure 2. By contrast, FIG. 4*b* shows a third alternative of a reset unit 1 according to the invention during application with an identical operating device 9 in an idle state, wherein the mesostructures 2 in this embodiment are connected in series with adaptive elements 8, here in the form of actuators. As opposed to the elastic elements on FIG. 4*a*, these are active elements that can be operated by a user. Therefore, by actuating the adaptive elements 8, a user can set the reset force thereby generated or the preload of the downstream mesostructure 2 as needed. Both the elastic and also the adaptive elements generate a preload on the downstream mesostructures 2. As a result, the reset unit 1, which is already variably configurable owing to the variability of the mesostructure 2, can once again be more flexibly used, and a force line can be determined in an especially precise manner.

FIG. 5 shows a reset unit 1 according to the invention with latching elements 9. Just as in the embodiments described above, the reset unit 1 here also has several mesostructures 2 connected in parallel, which are here only shown schematically. As depicted on FIGS. 1 and 2, the mesostructures 2 are here also provided with signal generators 4 and/or reaction units 5, which are only shown in the environment of the latching element 9 as elements arranged on the mesostructure 2. The signal generators 4 and/or reaction unit 5 are connected with the respective mesostructure 2 in such a way that a deformation of the mesostructure 2 leads to a change in position of the signal generator 4 and/or the reaction unit 5. By contrast, the latching elements 9 are immovable in design relative to a base, for example a housing of the reset unit 1. The latching elements 9 and signal generators 4 and/or reaction unit 5 are (electro) magnetic in design, so that a coupling arises between them based upon a magnetic pull. The coupling here arises only once a distance predefined by the corresponding magnetic field strengths has been reached between the latching elements 9 and signal generators 4 and/or reaction units 5. In addition, the latching elements 9 can be adaptively actuated by a simple current circuit. As a consequence, the latter can be switched on or off as needed. Likewise, the mentioned predefined distance can be adjusted as needed by selecting a corresponding current. Alternatively, the latter can also be adjusted by suitably actuating the reaction units 5.

FIG. 6*a* shows a first alternative of a reset unit 1 according to the invention during application with a flexible cam 12. In the application, an operating device that is movably, in particular swivelably, guided at one end in the cam 12, and the cam 12 are correspondingly deformed or displaced during a deflection of the operating device. Therefore, the depicted cam 12 can be variable in its basic shape, which amounts to a deformation, or be mounted so that it can only be moved in its entirety, so that the entire cam 12 is moved relative to a base during a displacement. The cam 12 is here reset into its idle position by the reset unit 1 effectively connected with it. Here as well, the reset unit 1 has several parallel connected mesostructures 2, which each reset individual areas of the cam 12 and the cam 12 in different directions of force based upon their orientation. By contrast, FIG. 6*b* shows a second alternative of a reset unit 1 according to the invention during application with a flexible cam 12, in which mesostructures 2 are connected in series to each other at selected locations. This yields other force lines, by means of which the reset force is varyingly adjusted depending on the position of the operating device in the cam 12 independently of the actual cam shape. As a result, for example, overprint points or other needs-based specific force lines or points can be generated. Contrary to the above, FIG. 6*c* shows a third alternative of a reset unit 1 according to the invention during application with a flexible cam 12, in which such an overprint point is generated by combining the springy mesostructures 2 and above all a volume body 15 on the cam 12, which can have a stiffness different than the cam 12. Here as well, the stiffness of the volume body 15 and the properties and arrangement of the mesostructures 2 make it possible to generate a needs-based force line in the area of the overprint point.

FIG. 7 shows a reset unit 1 according to the invention during application in the handle 13 of a control lever 11. The handle 13 of a control lever 11 is the end of the control lever 11 that is contacted by a user while in use. Accordingly, the surface of the handle 13 is a contact surface 14 for the user. The reset unit 1 is here arranged in the handle 13 in such a way that the user compresses the reset unit 1 while using the handle 13 due to the contact. Therefore, the user perceives the reset force depending on the intensity of the compression.

FIG. 8*a* shows the effect of a reset unit 1 according to the invention during application in the handle 13 of a control lever 11 with the control lever 11 moving in a negative x-direction. By contrast, FIG. 8*b* shows the effect of a reset unit according to the invention during application in the handle 13 of a control lever 11 with the control lever 11 moving in a positive x-direction. Using the reset unit 1 in the handle 13 of a control lever 11 as shown on FIG. 7 makes it possible to realize a presence detection by detecting pressure via deformation. This principle also enables the detection of the movement of the control lever 11 desired or initiated by the user. Therefore, the direction in which the control lever 11 is to be moved can be determined before the change in the angle of the latter caused by its movement arises. Given a fine segmentation of the reset unit 1 via its deformation, the exact position of the hand can likewise be identified. In the deflection in a positive x-direction shown on FIG. 8*b*, there is a pressure increase above on the rear side of the handle in the area of the thumb ball of the user, and a pressure reduction on the lower part of the front side of the handle in the area of the index finger to little finger of the user, or exclusively pressure on the rear side (b). By contrast, in the deflection in a negative x-direction shown on FIG. 8*a*, there is a pressure increase on the front side of the handle. During a deflection in a positive and negative y-direction, which is oriented perpendicular to the x- and z-direction, there is a pressure increase on the hand support surface and on its opposite side. During a combined movement, the mentioned directions of force become overlaid accordingly. The force vector determinable based thereupon serves as an additional channel for safety considerations or as a control parameter, which can be used to additionally control the device to be controlled via the control lever 11.

The invention claimed is:

1. A reset unit for resetting rotational and/or translational deflection movements of an operating device, which has an ordered mesostructure of elementary cells consisting of an ordered arrangement of at least one elementary cell, wherein the at least one elementary cell can be reversibly compressed and expanded through exposure to force, wherein the reset unit further has at least one signal generator and/or at least one reaction unit, wherein the reset unit further has at least one evaluation unit, which evaluates a signal emitted by the signal generator and/or electrically and/or magnetically actuates the reaction unit, wherein the signal generator and/or reaction unit are embedded in the at least one mesostructure, wherein a reset force of the reset unit can be at least partially generated by deforming the mesostructure.

2. The reset unit according to claim 1, wherein an elastic element or an adaptive element is placed upstream and/or downstream from at least one elementary cell in terms of force application.

3. The reset unit according to claim 2, wherein the elastic element is a spring or an elastomer.

4. The reset unit according to claim 2, wherein the adaptive element is an actuator or an MRF element.

5. The reset unit according to claim 1, wherein the evaluation unit is connected with the mesostructure not mechanically, but effectively.

6. The reset unit according to claim 1, wherein the shape and/or elasticity of the reaction unit can be influenced by a current applied thereto or a magnetic field.

7. The reset unit according to claim 1, wherein the reset unit has latching elements, which latch in the at least one signal generator and/or the at least one reaction unit at a prescribed position.

8. The reset unit according to claim 1, wherein the at least one signal generator and/or the at least one reaction unit are selected from the following group: Metal wire, metal particles, coil, electromagnet, carbon fiber, CFK fiber, conductive plastic, and magnet.

9. An operating device having a reset unit according to claim 1.

10. The operating device according to claim 9, wherein the operating device has a control lever, wherein the reset unit is mounted in the control lever.

11. The reset unit according to claim 10, wherein the reset unit is mounted in a handle of the control lever.

12. The operating device according to claim 9, wherein the operating device has a cam into which a control lever is guided, wherein the reset unit resets the cam.

13. The operating device according to claim 9, wherein the operating device has a contact surface contacted by a user, which is reset by the reset unit.

* * * * *